US009390543B2

(12) United States Patent
Panteleev et al.

(10) Patent No.: US 9,390,543 B2
(45) Date of Patent: Jul. 12, 2016

(54) GRAPHICS PROCESSING SUBSYSTEM AND METHOD FOR COMPUTING A THREE-DIMENSIONAL CLIPMAP (71) Applicant: Nvidia Corporation, Santa Clara, CA (US)

(72) Inventors: Alexey Panteleev, Moscow (RU); Yury Uralsky, Santa Clara, CA (US); Evgeny Makarov, Moscow (RU); Henry Moreton, Santa Clara, CA (US); Sergey Bolotov, Moscow (RU); Eric B Lum, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 179 days.

(21) Appl. No.: 14/163,801

(22) Filed: Jan. 24, 2014

(65) Prior Publication Data
US 2015/0109297 A1    Apr. 23, 2015

Related U.S. Application Data (60) Provisional application No. 61/892,288, filed on Oct. 17, 2013, provisional application No. 61/892,316, filed on Oct. 17, 2013.

(51) Int. Cl.
*G06T 15/08* (2011.01)
*G06T 15/00* (2011.01)
*G06T 15/20* (2011.01)
*G06T 15/80* (2011.01)

(52) U.S. Cl.
CPC .............. *G06T 15/005* (2013.01); *G06T 15/08* (2013.01); *G06T 15/20* (2013.01); *G06T 15/80* (2013.01)

(58) Field of Classification Search
None
See application file for complete search history.

(56) References Cited

U.S. PATENT DOCUMENTS

| 6,567,083 | B1 | 5/2003 | Baum et al. |
| 7,528,839 | B1 | 5/2009 | Cunniff et al. |
| 2002/0145611 | A1 | 10/2002 | Dye et al. |
| 2003/0122819 | A1 | 7/2003 | Koneru et al. |
| 2004/0008212 | A1 | 1/2004 | O'Neill |
| 2010/0091310 | A1 | 4/2010 | Thomas et al. |

(Continued)

OTHER PUBLICATIONS

John Whigham, "Goodbye Octrees," Jun. 18, 2013, http://johnwhigham.blogspot.com/2013/06/goodbye-octrees.html.*
Thiedemann et al , "Voxel-based Global Illumination," ACM, 2011.*

(Continued)

*Primary Examiner* — Kee M Tung
*Assistant Examiner* — Nicholas R. Wilson (57) ABSTRACT A graphics processing subsystem and method for computing a 3D clipmap. One embodiment of the subsystem includes: (1) a renderer operable to render a primitive surface representable by a 3D clipmap, (2) a geometry shader (GS) configured to select respective major-plane viewports for a plurality of clipmap levels, the major-plane viewports being sized to represent full spatial extents of the 3D clipmap relative to a render target (RT) for the plurality of clipmap levels, (3) a rasterizer configured to employ the respective major-plane viewports and the RT to rasterize a projection of the primitive surface onto a major plane corresponding to the respective major-plane viewports into pixels representing fragments of the primitive surface for each of the plurality of clipmap levels, and (4) a plurality of pixel shader (PS) instances configured to transform the fragments into respective voxels in the plurality of clipmap levels, thereby voxelizing the primitive surface.

19 Claims, 5 Drawing Sheets

(56) References Cited

U.S. PATENT DOCUMENTS

2014/0125653 A1  5/2014  Massarwa et al.
2014/0321704 A1  10/2014  Partis

OTHER PUBLICATIONS

Microsoft, "Shader Stages (Direct3D 10)," Nov. 28, 2011, http://web.archive.org/web/20111128061221/http://msdn.microsoft.com/en-us/library/windows/desktop/bb205146(v=vs.85).*

Eric Lengyel, "Voxel-Based Terrain for Real-Time Virtual Simulations," 2010.*

Forest, V., et al., "Real-Time Hierarchical Binary-Scene Voxelization," A K Peters Ltd., 2010, 14 pages.

Reinbothe, C. K., et al., "Hybrid Ambient Occlusion," Eurographics, 2009, 7 pages.

Crassin, C., et al. "Interactive Indirect Illumination Using Voxel Cone Tracing," Computer Graphics Forum, vol. 30, No. 7, Blackwell Publishing Ltd., 2011, 10 pages.

Tanner, C. C., et al., "The Clipmap: A Virtual Mipmap," Proceedings of the 25th Annual Conference on Computer Graphics and Interactive Techniques, ACM, 1998, 8 pages.

Hur, J., et al., "Voxel-based Global Illumination," Computer Graphics and Image Processing Laboratory, 2011, 35 pages.

Williams, L., "Pyramidal Parametrics," Computer Graphics, vol. 17, No. 3, Jul. 1983, 11 pages.

* cited by examiner

GRAPHICS PROCESSING SUBSYSTEM AND METHOD FOR COMPUTING A THREE-DIMENSIONAL CLIPMAP

CROSS-REFERENCE TO RELATED APPLICATION

This application claims the benefit of U.S. Provisional Application Ser. No. 61/892,288, filed by Bolotov, et al., on Oct. 17, 2013, entitled "A Method for Optimizing Regions for Voxelization Updates," and U.S. Provisional Application Ser. No. 61/892,316, filed by Bolotov, et al., on Oct. 17, 2013, entitled "Using Clipmaps to Represent Volumetric Data for GI and AO Algorithms," commonly assigned with this application and fully incorporated herein by reference.

TECHNICAL FIELD

This application is directed, in general, to a graphics processing subsystem and, more specifically, to computing a three-dimensional (3D) clipmap representation of a rendered primitive surface in a scene.

BACKGROUND

Many computer graphic images are created by mathematically modeling the interaction of light with a 3D scene from a given viewpoint. This process, called "rendering," generates a two-dimensional (2D) image of the scene from the given viewpoint, and is analogous to taking a photograph of a real-world scene.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem, architecturally centered about a graphics processing unit (GPU). Typically, the CPU performs high-level operations, such as determining the position, motion, and collision of objects in a given scene. From these high-level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

Scene geometry is typically represented by geometric primitives, such as points, lines, polygons (for example, triangles and quadrilaterals), and curved surfaces, defined by one or more two- or three-dimensional vertices. Each vertex may have additional scalar or vector attributes used to determine qualities such as the color, transparency, lighting, shading, and animation of the vertex and its associated geometric primitives.

Many graphics processing subsystems are highly programmable through an application programming interface (API), enabling complicated lighting and shading algorithms, among other things, to be implemented. To exploit this programmability, applications can include one or more graphics processing subsystem programs, which are executed by the graphics processing subsystem in parallel with a main program executed by the CPU. Although not confined merely to implementing shading and lighting algorithms, these graphics processing subsystem programs are often referred to as "shading programs," "programmable shaders," or simply "shaders."

A variety of shading programs are directed at modeling illumination in a scene. The physical plausibility of rendered illumination often depends on the application, more specifically, whether or not the rendering is done in real-time. Physically plausible illumination at real-time frame rates is often achieved using approximations. For example, ambient occlusion is a popular approximation because of its high speed and simple implementation. Another example is directional occlusion. Many algorithms can only approximate direct illumination, which is light coming directly from a light source.

Global illumination, or GI, is a concept that accounts for both direct illumination and indirect illumination, which is light that reflects off other surfaces, in rendering the scene. In doing so, a significantly more realistic image is achievable. However, real-time global illumination remains problematic for large and dynamic scenes. Efforts to mitigate the latency introduced by these comprehensive illumination algorithms are ongoing. For example, some algorithms partially pre-compute illumination. Another example is instant radiosity, which models indirect lighting as a set of point lights, the contributions of which are accumulated over multiple rendering passes. Yet another approach is to limit indirect lighting to a single bounce, under the assumption that one-bounce indirect illumination is sufficiently realistic. Still, real-time frame rates are typically only achievable through approximations.

Ambient occlusion, or AO, is an example of a shading algorithm, commonly used to add a global illumination look to rendered images. AO is not a natural lighting or shading phenomenon. In an ideal system, each light source would be modeled to determine precisely the surfaces it illuminates and the intensity at which it illuminates them, taking into account reflections, refractions, scattering, dispersion and occlusions. In computer graphics, this analysis is accomplished by ray tracing or "ray casting." The paths of individual rays of light are traced throughout the scene, colliding and reflecting off various surfaces.

In non-real-time applications, each surface in the scene can be tested for intersection with each ray of light, producing a high degree of visual realism. This presents a practical problem for real-time graphics processing: rendered scenes are often very complex, incorporating many light sources and many surfaces, such that modeling each light source becomes computationally overwhelming and introduces large amounts of latency into the rendering process. AO algorithms address the problem by modeling light sources with respect to an occluded surface in a scene: as white hemispherical lights of a specified radius, centered on the surface and oriented with a normal vector at the occluded surface. Surfaces inside the hemisphere cast shadows on other surfaces. AO algorithms approximate the degree of occlusion caused by the surfaces, resulting in concave areas such as creases or holes appearing darker than exposed areas. AO gives a sense of shape and depth in an otherwise "flat-looking" scene.

The most realistic AO techniques are global; the illumination at each point is a function of other geometry in the scene. Screen-space AO (SSAO) can render only local effects and therefore fails to recognize the more subtle illuminations that lend realism. For this reason, SSAO will not be further described herein.

Several methods are available to compute global AO, but its sheer computational intensity makes it an unjustifiable luxury for most real-time graphics processing systems. To appreciate the magnitude of the effort AO entails, consider a given point on a surface in the scene and a corresponding hemispherical normal-oriented light source surrounding it. The illumination of the point is approximated by integrating the light reaching the point over the hemispherical area. The fraction of light reaching the point is a function of the degree to which other surfaces obstruct each ray of light extending from the surface of the sphere to the point.

SUMMARY

One aspect provides a graphics processing subsystem. In one embodiment, the subsystem includes: (1) a renderer operable to render a primitive surface representable by a 3D clipmap, (2) a geometry shader (GS) configured to select respective major-plane viewports for a plurality of clipmap levels, the major-plane viewports being sized to represent full spatial extents of the 3D clipmap relative to a render target (RT), (3) a rasterizer configured to employ the respective major-plane viewports and the RT to rasterize a projection of the primitive surface onto a major plane corresponding to the respective major-plane viewports into pixels representing fragments of the primitive surface for each of the plurality of clipmap levels, and (4) a plurality of pixel shader (PS) instances configured to transform the fragments into respective voxels in the plurality of clipmap levels, thereby voxelizing the primitive surface.

In another embodiment, the subsystem includes: (1) a memory configured to store: (1a) a 3D clipmap representing a primitive surface in a scene and having a plurality of clipmap levels, (1b) an RT for the plurality of clipmap levels, and (1c) respective major-plane viewports for the plurality of clipmap levels, wherein each of the respective major-plane viewports represent full extents of the 3D clipmap relative to the RT, (2) a renderer operable to render an update to the primitive surface, (3) a GS configured to: (3a) select a major plane that maximizes area of the primitive surface's projection thereon, (3b) generate a projection of the primitive surface onto the major plane, and (3c) replicate the projection for each of the plurality of clipmap levels, thereby generating respective instances of the primitive surface, (4) a rasterizer configured to employ the RT and respective major-plane viewports that correspond to the major plane to rasterize the respective instances into pixels representing fragments of the primitive surface for each of the plurality of clipmap levels, and (5) a plurality of PS instances configured to transform the fragments into respective voxels in the plurality of clipmap levels and cause the respective voxels to be written to the memory, thereby carrying out the update on the 3D clipmap.

Another aspect provides a method of computing a 3D clipmap representation of a rendered primitive surface in a scene. In one embodiment, the method includes: (1) defining respective major-plane viewports and an RT for a plurality of clipmap levels, wherein the respective major-plane viewports represent full extents of the 3D clipmap representation relative to the plurality of clipmap levels and the RT maintain a constant clip level resolution, (2) selecting a major plane and corresponding respective major-plane viewports, wherein the major plane maximizes a projected area of the rendered primitive surface thereon, and (3) employing the corresponding respective major-plane viewports, the RT, and the projected area in voxelizing the rendered primitive surface into the plurality of clipmap levels.

BRIEF DESCRIPTION

Reference is now made to the following descriptions taken in conjunction with the accompanying drawings, in which.

DETAILED DESCRIPTION

A mipmap is a collection of correlated images of increasingly reduced resolution. "Mip" is actually an acronym representing the Latin phrase "multum in parvo," meaning "much in little." Mipmaps are often described as resolution pyramids, starting with level zero, the largest and finest level. Each lower level represents the image using half as many texels in each dimension. Consequently, for a two-dimensional (2D) image, each lower level consumes one-quarter of the memory required for the level above. For a 3D scene, each lower level consumes one-eighth the memory required for the level above. Rendering processes can gain access to the various levels of detail (LODs) to use the texels contained therein to render an image. Mipmaps are intended to increase rendering speed and reduce aliasing.

A clipmap is a representation of a partial mipmap in which the finest levels are clipped to a specified maximum size. Rather than the pyramidal shape seen in mipmaps, the clipmap more resembles an obelisk. Clipped levels are referred to as clip levels and unclipped levels are referred to as mip levels. A clipmap has at least one mip level and at least one clip level. The mip levels of a clipmap represent the same spatial region of a scene with increasing resolution, beginning with the coarsest level. Each of the clip levels has the same resolution that is equal to the resolution of the finest mip level. While the clip levels maintain a constant resolution across the corresponding LODs, the respective spatial regions represented shrink as the LODs become finer. This representation reduces the amount of memory required to represent parts of the scene with high spatial resolution and cover a large region of the scene at the same time.

Clipmaps resulted from the realization that the majority of a mipmap is not used to render a single frame of a scene. In fact, the viewpoint and display resolution determine the part of the mipmap that is used to render a frame. The clipmap is intended to be the minimal subset of the mipmap needed to render each frame. Thus clipmaps should be updated as frames change over time. For this reason, practical clipmaps are updatable.

The clipmap data structure can be expanded to represent volumetric data for a 3D scene. Volumetric data is packaged in a volumetric pixel, or "voxel." Clipmaps were originally implemented as 2D mipmaps with the finest levels clipped such that they have the same number of texels, but cover different sized spatial regions. A 3D clipmap has advantages over alternative representations, such as a sparse voxel octree, in that it can be updated more quickly and more quickly sampled than an octree.

Clipmaps can be used in many graphics rendering processes, including ambient occlusion (AO) and global illumination (GI). To evaluate a viewpoint in a particular scene, the scene is voxelized to form a clipmap that is centered on or, in some embodiments, slightly offset from, the viewpoint. Generally, when computing an effect on the viewpoint, geometry that is further from the viewpoint has less impact on the computation than nearer geometry. When processing the viewpoint, samples are taken from the various LODs of the clipmap. Nearer samples are taken from the finer LODs, and distant samples are taken from the coarser LODs.

Updating the clipmap quickly is essential to using clipmaps in processes such as AO or GI for large scenes or animated objects. It is realized herein that rendering the scene multiple times per frame to update the various clipmap levels is inefficient, because it creates additional processing load for the graphics processing subsystem and possibly the CPU. It is realized herein the scene geometry can be rendered just once per frame and then replicated, or "instanced," in a GS. It is further realized herein the GS can instance the geometry by using an array of viewports to represent the various LODs of the clipmap. A viewport is a rectangular viewing window for projecting a 3D scene onto a 2D display. It is realized herein the geometry can be rasterized by the GPU for each LOD in the clipmap by using a viewport that is sized such that it represents the full clipmap extents relative to an RT. The RT is sized to maintain a constant resolution across all clipmap levels and, therefore, assumes its smallest spatial dimensions for the finest LOD. The viewport is sized relative to that RT, typically making the viewport larger than the RT, which is contrary to typical implementations of viewports and RTs. The viewport spatial dimensions are scaled such that the RT contains the appropriate portion of the volume for a given LOD.

For example, at the coarsest LOD, the RT and viewport assume the same spatial dimensions. At the next finer LOD, the RT dimensions are halved in each dimension, but the RT maintains the clip level resolution. The viewport dimensions are doubled in each dimension for the next finer LOD, making the area within the viewport four times larger than the area within the RT, which is the appropriate ratio for that LOD. As the LODs become increasingly finer, the viewport dimensions continue to expand to achieve the appropriate ratio of viewport area to RT area for the LOD.

It is also realized herein the voxelization processing load can be optimized by optimizing the selection of the viewport for each LOD of the clipmap. A primitive surface can be voxelized by projecting it onto a viewport, rasterizing, and then transforming the 2D positions into 3D positions based on the "depth" of the 2D position. The transforming is typically carried out by instances, e.g., threads, of a PS. As those skilled in the pertinent art understand, a PS is a program designed to be instantiated multiple times in a GPU to process pixels of an image in parallel. It is realized herein, for a given LOD of a clipmap, a viewport can be created for each of the three major planes of the clipmap, those major planes being defined by the X, Y, and Z axes. Of those major-plane viewports, it is realized herein, one can maximize parallelization of voxelization processing. It is realized herein that by selecting the major plane that increases (e.g., maximizes) the area of a projected primitive surface onto the major plane, the serial processing load for each PS is reduced (e.g., minimized). It is further realized herein the trade-off is an increase in the number of PS instances required to carry out the pixel computations. However, modern GPUs and graphics processing subsystems provide increasingly larger numbers of parallel "lanes" within which these PS processes can be executed.

Before describing various embodiments of the graphics processing subsystem and method of computing a 3D clipmap introduced herein, a computing system within which the graphics processing subsystem or method maybe embodied or carried out will be described.

Figure 1:
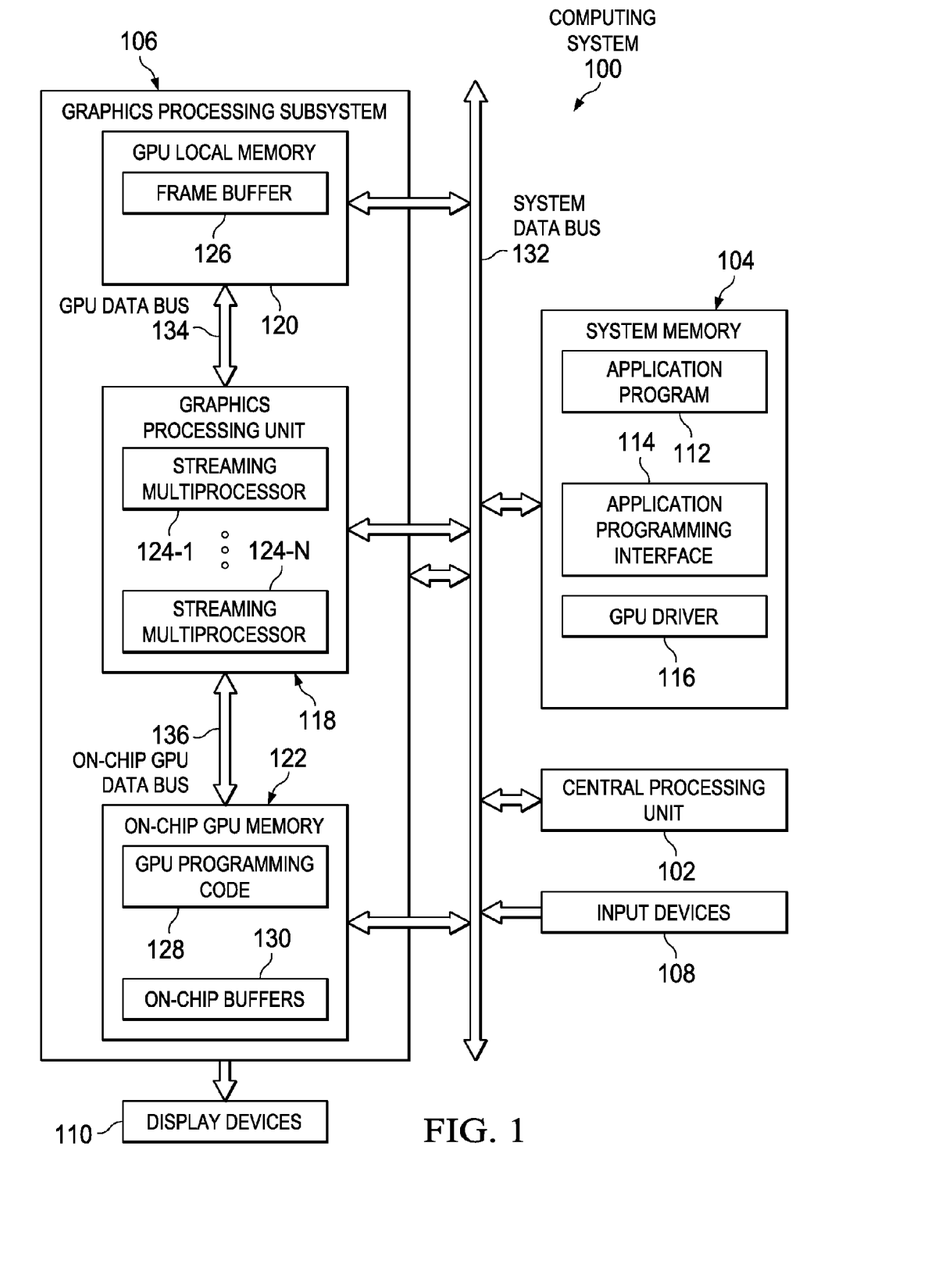
FIG. 1 is a block diagram of one embodiment of a computing system.
Figure 2A:
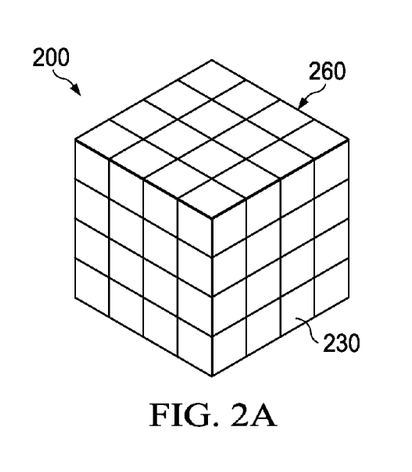
FIGS. 2A-2E are illustrative diagrams of one embodiment of a 3D clipmap.
Figure 2B:
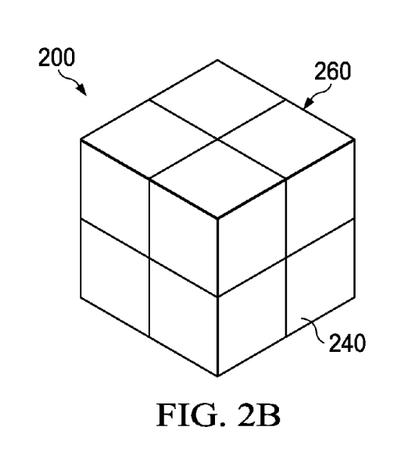
Figure 2C:
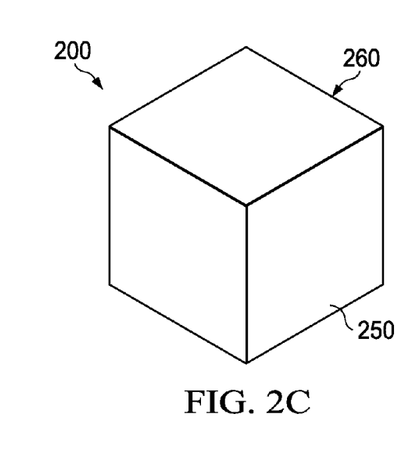
Figure 2D:
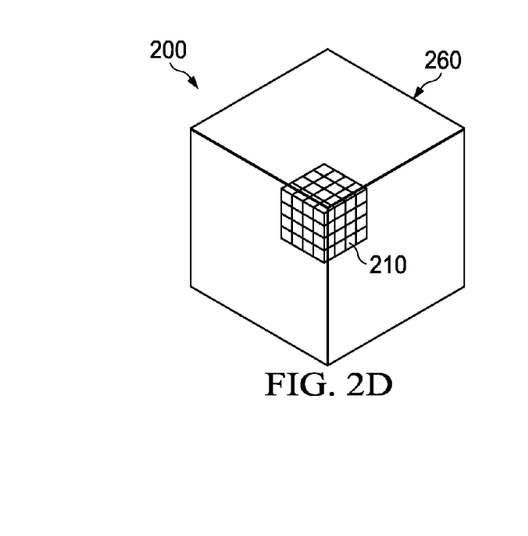
Figure 2E:
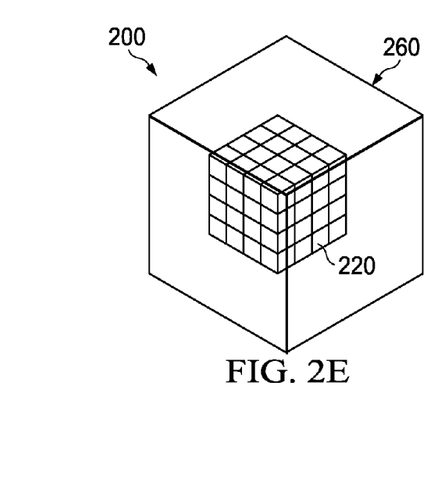

FIG. 1 is a block diagram of one embodiment of a computing system 100 in which one or more aspects of the invention may be implemented. The computing system 100 includes a system data bus 132, a CPU 102, input devices 108, a system memory 104, a graphics processing subsystem 106, and display devices 110. In alternate embodiments, the CPU 102, portions of the graphics processing subsystem 106, the system data bus 132, or any combination thereof, may be integrated into a single processing unit. Further, the functionality of the graphics processing subsystem 106 may be included in a chipset or in some other type of special purpose processing unit or co-processor.

As shown, the system data bus 132 connects the CPU 102, the input devices 108, the system memory 104, and the graphics processing subsystem 106. In alternate embodiments, the system memory 100 may connect directly to the CPU 102. The CPU 102 receives user input from the input devices 108, executes programming instructions stored in the system memory 104, operates on data stored in the system memory 104, and configures the graphics processing subsystem 106 to perform specific tasks in the graphics pipeline. The system memory 104 typically includes dynamic random-access memory (DRAM) employed to store programming instructions and data for processing by the CPU 102 and the graphics processing subsystem 106. The graphics processing subsystem 106 receives instructions transmitted by the CPU 102 and processes the instructions in order to render and display graphics images on the display devices 110.

As also shown, the system memory 104 includes an application program 112, an application programming interface (API) 114, and a GPU driver 116. The application program 112 generates calls to the API 114 in order to produce a desired set of results, typically in the form of a sequence of graphics images. The application program 112 also transmits zero or more high-level shading programs to the API 114 for processing within the GPU driver 116. The high-level shading programs are typically source code text of high-level programming instructions that are designed to operate on one or more shading engines within the graphics processing subsystem 106. The API 114 functionality is typically implemented within the GPU driver 116. The GPU driver 116 is configured to translate the high-level shading programs into machine code shading programs that are typically optimized for a specific type of shading engine (e.g., vertex, geometry, or fragment).

The graphics processing subsystem 106 includes a GPU 118, an on-chip GPU memory 122, an on-chip GPU data bus 136, a GPU local memory 120, and a GPU data bus 134. The GPU 118 is configured to communicate with the on-chip GPU memory 122 via the on-chip GPU data bus 136 and with the GPU local memory 120 via the GPU data bus 134. The GPU 118 may receive instructions transmitted by the CPU 102, process the instructions in order to render graphics data and images, and store these images in the GPU local memory 120. Subsequently, the GPU 118 may display certain graphics images stored in the GPU local memory 120 on the display devices 110.

The GPU 118 includes one or more streaming multiprocessors 124. Each of the streaming multiprocessors 124 is capable of executing a relatively large number of threads concurrently. Advantageously, each of the streaming multiprocessors 124 can be programmed to execute processing tasks relating to a wide variety of applications, including but not limited to linear and nonlinear data transforms, filtering of video and/or audio data, modeling operations (e.g., applying of physics to determine position, velocity, and other attributes of objects), and so on. Furthermore, each of the streaming multiprocessors 124 may be configured as a shading engine that includes one or more programmable shaders, each executing a machine code shading program (i.e., a thread) to perform image rendering operations. The GPU 118 may be provided with any amount of on-chip GPU memory 122 and GPU local memory 120, including none, and may employ on-chip GPU memory 122, GPU local memory 120, and system memory 104 in any combination for memory operations.

The on-chip GPU memory 122 is configured to include GPU programming code 128 and on-chip buffers 130. The GPU programming 128 may be transmitted from the GPU driver 116 to the on-chip GPU memory 122 via the system data bus 132. The GPU programming 128 may include a machine code vertex shading program, a machine code geometry shading program, a machine code fragment shading program, or any number of variations of each. The on-chip buffers 130 are typically employed to store shading data that requires fast access in order to reduce the latency of the shading engines in the graphics pipeline. Since the on-chip GPU memory 122 takes up valuable die area, it is relatively expensive.

The GPU local memory 120 typically includes less expensive off-chip dynamic random access memory (DRAM) and is also employed to store data and programming employed by the GPU 118. As shown, the GPU local memory 120 includes a frame buffer 126. The frame buffer 126 stores data for at least one two-dimensional surface that may be employed to drive the display devices 110. Furthermore, the frame buffer 126 may include more than one two-dimensional surface so that the GPU 118 can render to one two-dimensional surface while a second two-dimensional surface is employed to drive the display devices 110.

The display devices 110 are one or more output devices capable of emitting a visual image corresponding to an input data signal. For example, a display device may be built using a cathode ray tube (CRT) monitor, a liquid crystal display, or any other suitable display system. The input data signals to the display devices 110 are typically generated by scanning out the contents of one or more frames of image data that is stored in the frame buffer 126.

Having described a computing system within which the graphics processing subsystem and method of computing a 3D clipmap may be embodied or carried out, various embodiments of the graphics processing subsystem and method will be described.

FIGS. 2A-2E are illustrative diagrams of one embodiment of a 3D clipmap 200. 3D clipmap 200 includes five LODs. Three LODs are mip levels, including mip level 250, mip level 240, and mip level 230. Two of the five LODs are clip levels, which include clip level 220 and clip level 210. Alternate embodiments of 3D clipmap 200 can include any number of mip levels and clip levels, so long as it includes at least one clip level and at least one mip level. The coarsest LOD in 3D clipmap 200 defines the spatial extents of the spanned region, a volume 260, making it a mip level. The finest LOD in 3D clipmap 200 must be a clip level, otherwise 3D clipmap 200 would simply be a mipmap.

Mip level 250 is the coarsest LOD in 3D clipmap 200 and includes a single voxel that represents the full spatial extent spanned by 3D clipmap 200, volume 260. Consequently, mip level 250 requires the least memory to store. Mip level 240 doubles the resolution in each dimension with respect to mip level 250, making the resolution eight voxels. Mip level 230 again doubles the resolution in each dimension with respect to mip level 240, making the resolution 64 voxels. As resolution increases from mip level 250, to mip level 240, to mip level 230, the memory necessary to store those LODs also increases. The spatial regions, or volumes, spanned by mip level 250, mip level 240, and mip level 230 are the same.

Clip level 220 maintains the 64 voxel resolution of mip level 230, increases the detail represented, and decreases the spatial region represented by the LOD. In a 3D mipmap representation, the resolution would again double in each dimension. However, 3D clipmap 200 clips voxels outside the maximum size for each dimension, thereby leaving a portion of the full spatial extent, volume 260, unrepresented in clip level 220. Clip level 220 is centered about a viewpoint, which is located where the octants of clip level 220 meet.

Clip level 210 is the finest LOD in 3D clipmap 200 and also maintains the 64 voxel resolution of mip level 230 and clip level 220. Clip level 210 increases the detail represented relative to clip level 220 and decreases the spatial region represented by the LOD. Clip level 210 leaves a larger portion of the full spatial extent, volume 260, unrepresented than clip level 220 and is centered about the same viewpoint.

As stated above, it is realized herein that scene geometry can be rendered just once per frame and thereafter instanced in a GS. To make the GS simpler, an array of viewports is used that represent different LODs of the clipmap. If each level is a cube with C texels in every dimension, an array of L viewports is created in which each viewport represents the full clipmap extent relative to one of the clipmap levels. A square RT with C pixels in both dimensions is also created for the clipmap.

Figure 3:
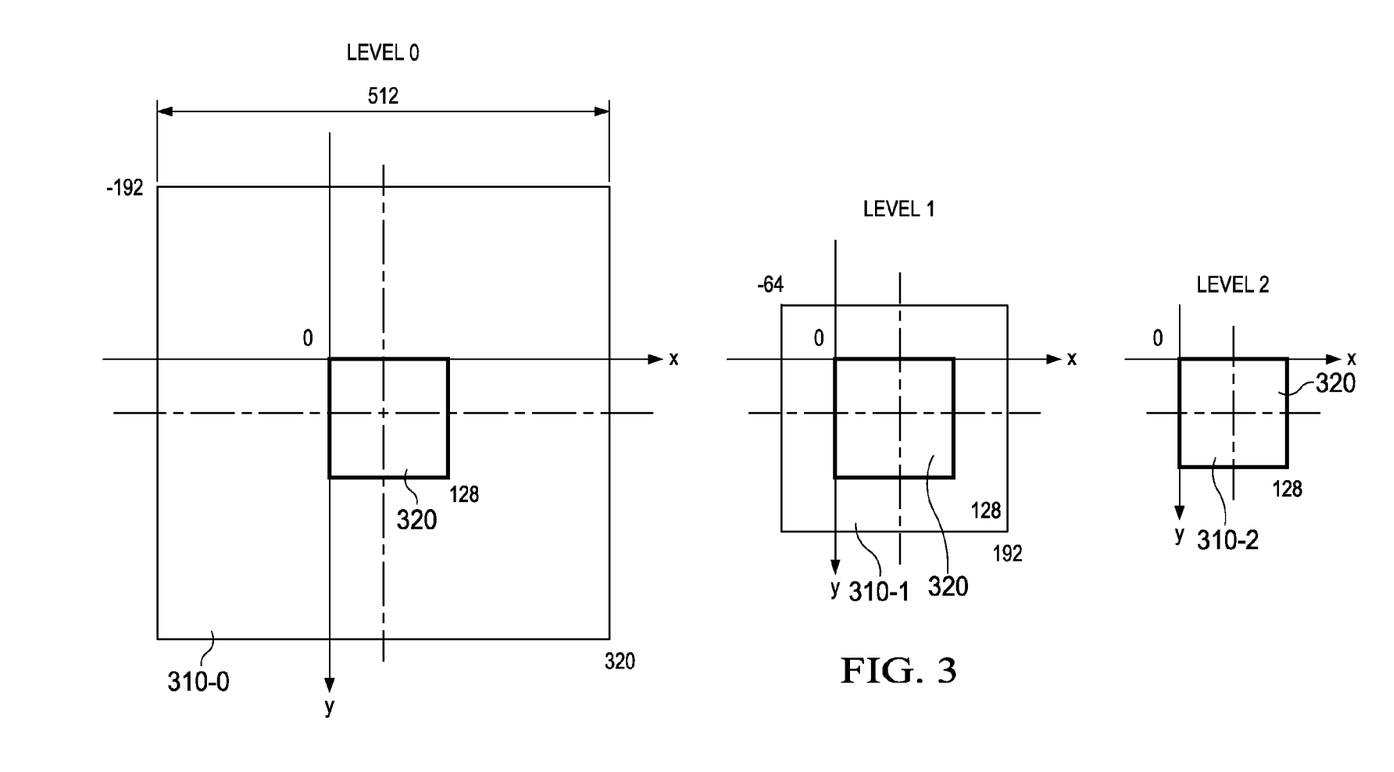
FIG. 3 is a diagram showing three levels of an example clipmap.

To illustrate this, FIG. 3 shows three levels of an example clipmap having L levels: Level 0, Level 1 and Level 2, in which each level has an associated viewport 310-0, 310-1, 310-2 and RT 320 for C=128 and L=3. The viewport 310-2 in Level 2 and the RT 320 assume the same spatial dimensions. While Levels 0, 1 and 2 of the example clipmap of FIG. 3 are cubic, non-cubic levels can be accommodated in a straightforward manner through the use of additional RTs.

Figure 4:
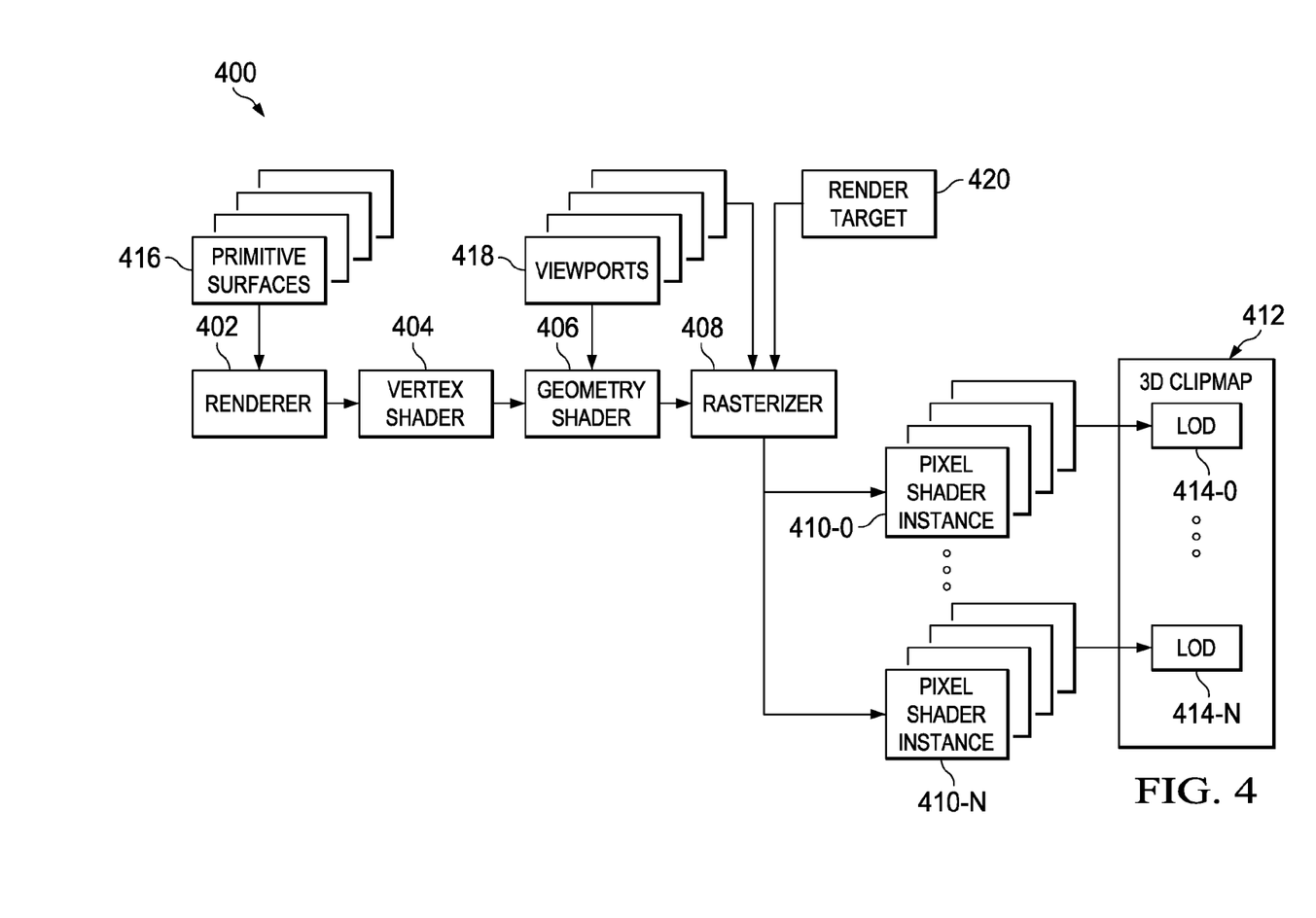
FIG. 4 is a block diagram of one embodiment of a graphics processing subsystem.

FIG. 4 is a block diagram of one embodiment of a graphics processing subsystem 400. Graphics processing subsystem 400 includes a renderer 402, a vertex shader (VS) 404, a GS 406, a rasterizer 408, and PS instances 410-0 through 410-N. Graphics processing subsystem 400 is operable to compute a 3D clipmap 412 that represents primitive surfaces 416. 3D clipmap 412 includes N LODs, LOD 414-0 through 414-N.

Primitive surfaces 416 are triangular surfaces in a 3D scene. Each time the scene is drawn or updated, renderer 402 renders primitive surfaces 416. In certain embodiments, the application that generates primitive surfaces 416 identifies particular surfaces or regions containing particular surfaces that require an update, thus renderer 402 would render only the necessary primitive surfaces. Additionally, renderer 402 need only render primitive surfaces 416 a single time, as opposed to rendering primitive surfaces 416 multiple times for each of the LODs in 3D clipmap 412. Renderer 402 is generally a rendering pipeline, or collection of rendering modules for carrying out the various rendering processes. Primitive surfaces 416 are rendered by renderer 402 as geometric meshes that intersect one or more LOD in 3D clipmap 412. The meshes are rendered in an object reference frame, referred to as object-space.

VS 404 transforms the coordinates of the vertices in the geometric meshes generated by renderer 402 from object-space into world-space, a common reference frame for all of primitive surfaces 416. Primitive surfaces 416 are represented in world-space as a collection of triangles. GS 406 instances the collection of triangles for each of the N LODs in 3D clipmap 412. Each instance of the triangles is rasterized separately by rasterizer 408 for each LOD. Rasterizer 408 employs viewports 418 and RT 420 to rasterize the triangles.

Viewports 418 include major-plane viewports for each LOD in clipmap 412. GS 406 selects which of the major planes should be used by rasterizer 408 as the viewport. The selection is made by determining onto which major plane a projection of a triangle would maximize the projected area. The major-plane viewports for each of LODs 414-0 through 414-N corresponding to that major plane are passed to rasterizer 408.

Rasterizer 408 employs both the viewport corresponding to a particular LOD and the RT 420 to rasterize the projected triangle. Viewports 418 are sized relative to the RT 420. For a given LOD, its corresponding major-plane viewports are sized such that they represent the full extents of 3D clipmap 412 relative to RT 420.

Rasterizer 408 generates 2D images of primitive surfaces 416 for each of LODs 414-0 through 414-N. The 2D images are composed of pixels representing fragments of primitive surfaces 416. The primitives are scaled according to the viewport dimensions, but only fragments that belong to the render target are produced, which essentially clips the rasterized image for all LODs except the coarsest one. Graphics processing subsystem includes a PS instance for each pixel in each of LODs 414-0 through LOD 414-N. PS instances 410-0 are configured to transform the pixels for LOD 414-0 into voxels. PS instances 410-0 through 410-N employ the rasterized triangles and the depth data from the projection of primitive surfaces 416 onto the selected major plane to compute voxel locations for each clipmap level. PS instances 410-0 through 410-N then gain access to the memory in which 3D clipmap 412 is stored and update the appropriate LODs 414-0 through 414-N.

Figure 5:
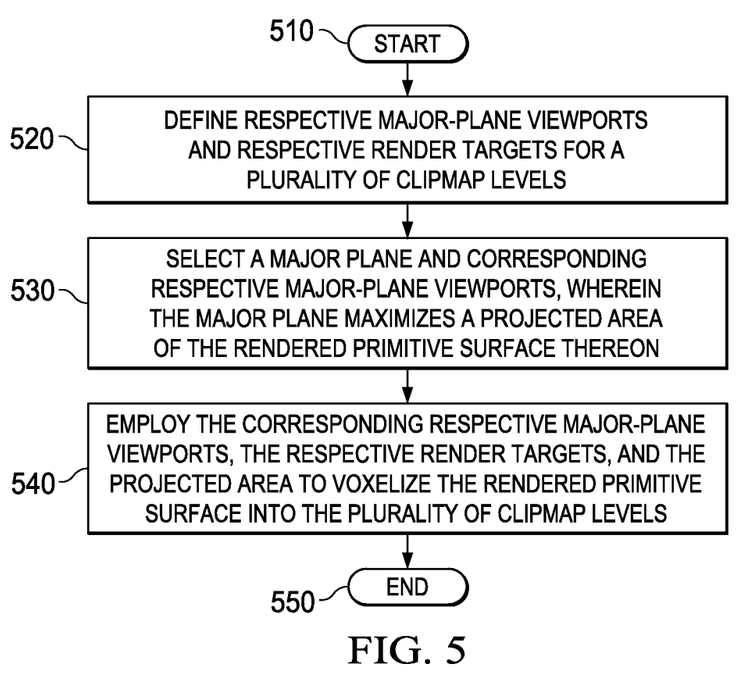
FIG. 5 is a flow diagram of one embodiment of a method of computing a 3D clipmap representation of a primitive surface in a scene.

FIG. 5 is a flow diagram of one embodiment of a method for computing a 3D clipmap representation of a rendered primitive surface in a scene. The method beings in a start step 510. In a definition step 520, respective major-plane viewports are defined for the LODs of the clipmap. The defined major-plane viewports include a viewport for each of the three major planes: X-Y, X-Z, and Y-Z. Additionally, an RT is defined such that the clip level resolution is maintained across the LODs. Each of the respective major-plane viewports is defined such that its dimensions represent the full extents of the clipmap relative to the RT.

The rendered primitive surface is typically rendered in an object reference frame, or "object-space." Primitive surfaces are typically triangles, although they are not limited to triangles. The rendered primitive surface, in certain embodiments, is transformed from object-space into a reference frame that can be used for computing the 3D clipmap, such as world-space or a "clipmap-space." This transformation is typically carried out by a VS. The VS transforms coordinates from one reference frame to another.

Continuing the embodiment of FIG. 5, in a selection step 530, a major plane is selected that maximizes the projected area of the rendered primitive onto the major plane. By selecting the major plane, a corresponding major-plane viewport is effectively selected. The selection can be made in a variety of ways. For example, in certain embodiments, the normal of the rendered primitive surface can be projected onto the major axes and the projection compared. The major axis having the largest magnitude projected thereon is perpendicular to the major plane that would maximize the projected area. For example, in an embodiment where the primitive surface has a unit normal vector, if that primitive surface is nearly parallel to a major plane, the projection of the unit normal vector onto a perpendicular axis would have a magnitude of nearly one. Likewise, that same unit normal vector projected onto the remaining two axes would have a magnitude of nearly zero, as the unit normal vector is effectively orthogonal to both those axes. The projection of a primitive surface onto a major plane that is parallel maximizes the projected area. As the primitive surface becomes less parallel to a major plane, the maximum projected area is found by minimizing the angle subtended by the primitive surface and the major plane, which can be quantified by comparing the projected normal vectors, or simply "normals."

In the embodiment of FIG. 5, the selected major-plane viewport and RT are employed in a voxelization step 540. The rendered primitive is projected onto the selected major plane, via the selected major-plane viewport, and rasterized using the selected major-plane viewport and the corresponding RT for each LOD in the clipmap. Rasterization generates a 2D representation of the rendered primitive surface. Each pixel in the 2D representation represents a fragment of the rendered primitive surface. Each fragment has a depth that is ultimately represented by the voxels in the 3D clipmap. The voxels are generated by employing the depth data for the projected rendered primitive to transform the 2D positions of each fragment into one or more 3D locations in the corresponding clipmap level. The voxels are packed with data and stored in the 3D clipmap data structure. The voxelization is repeated for each LOD in the clipmap. The method then ends in an end step 550.

Those skilled in the art to which this application relates will appreciate that other and further additions, deletions, substitutions and modifications may be made to the described embodiments.

What is claimed is:

1. A graphics processing subsystem, comprising:
   a renderer operable to render a primitive surface representable by a three-dimensional (3D) clipmap;
   a geometry shader (GS) configured to select respective major-plane viewports for a plurality of clipmap levels, said major-plane viewports being sized to represent full spatial extents of said 3D clipmap relative to a render target (RT) for said plurality of clipmap levels;
   a rasterizer configured to employ said respective major-plane viewports and said RT to rasterize a projection of said primitive surface onto a major plane to provide a projection area corresponding to said respective major-plane viewports into pixels representing fragments of said primitive surface for each of said plurality of clipmap levels; and
   a plurality of pixel shader (PS) instances configured to transform said fragments into respective voxels in said plurality of clipmap levels, thereby voxelizing said primitive surface.

2. The graphics processing subsystem as recited in claim 1 wherein said RT has a constant resolution for each of said plurality of clipmap levels.

3. The graphics processing subsystem as recited in claim 1 wherein said respective major-plane viewports include three major-plane viewports for each of said plurality of clipmap levels.

4. The graphics processing subsystem as recited in claim 3 wherein said GS is further configured to determine onto which of the three major planes, corresponding to said three major-plane viewports, said projection maximizes the projected area in selecting said major-plane viewports.

5. The graphics processing subsystem as recited in claim 1 wherein said RT is centered at corresponding respective major-plane viewports.

6. The graphics processing subsystem as recited in claim 1 wherein said renderer is configured to render said primitive surface once, and said GS is configured to employ said respective major-plane viewports and said respective render targets to instance said primitive surface for each of said plurality of clipmap levels.

7. The graphics processing subsystem as recited in claim 1 wherein said plurality of PS instances are configured to voxelize said primitive surface into only a subset of said plurality of clipmap levels, wherein said primitive surface intersects only said subset.

8. A method of computing a three-dimensional (3D) clipmap representation of a rendered primitive surface in a scene, comprising:
    defining respective major-plane viewports and a render target (RT) for a plurality of clipmap levels, wherein said respective major-plane viewports represent full extents of said 3D clipmap representation relative to said plurality of clipmap levels and said RT maintains a constant clip level resolution;
    employing a vertex shader in transforming said rendered primitive surface from an object space to a clipmap space;
    selecting a major plane and corresponding respective major-plane viewports, wherein said major plane maximizes a projected area of said rendered primitive surface thereon; and
    employing said corresponding respective major-plane viewports, said RT, and said projected area in voxelizing said rendered primitive surface into said plurality of clipmap levels.

9. The method as recited in claim 8 wherein said selecting includes comparing projections of a normal of said rendered primitive surface onto three major axes of said scene.

10. The method as recited in claim 8 wherein said projected area is respectively divisible into a plurality of fragments for each of said plurality of clipmap levels.

11. The method as recited in claim 10 wherein said employing includes creating a pixel shader for each of said plurality of fragments for each of said plurality of clipmap levels to carry out said voxelizing.

12. The method as recited in claim 11 wherein said voxelizing includes transforming positions of said plurality of fragments into respective 3D locations in said plurality of clipmap levels.

13. The method as recited in claim 8 wherein said respective major-plane viewports are increasingly larger relative to said RT for said plurality of clipmap levels.

14. A graphics processing subsystem, comprising:
    a memory configured to store:
        a three-dimensional (3D) clipmap representing a primitive surface in a scene and having a plurality of clipmap levels,
        a render target (RT) having a constant resolution for said plurality of clipmap levels, and
        respective major-plane viewports for said plurality of clipmap levels, wherein each of said respective major-plane viewports represent full extents of said 3D clipmap relative to a corresponding RT of said RT;
    a renderer operable to render an update to said primitive surface;
    a geometry shader (GS) configured to:
        select a major plane that maximizes area of a projection of said primitive surface thereon,
        generate a projection of said primitive surface onto said major plane, and
        replicate said projection for each of said plurality of clipmap levels, thereby generating respective instances of said primitive surface;
    a rasterizer configured to employ said RT and respective major-plane viewports that correspond to said major plane to rasterize said respective instances into pixels representing fragments of said primitive surface for each of said plurality of clipmap levels; and
    a plurality of pixel shader (PS) instances configured to transform said fragments into respective voxels in said plurality of clipmap levels and cause said respective voxels to be written to said memory, thereby carrying out said update on said 3D clipmap.

15. The graphics processing subsystem as recited in claim 14 wherein said major plane is selected from an X-Y plane, an X-Z plane, and an Y-Z plane.

16. The graphics processing subsystem as recited in claim 15 wherein said GS is further configured to compare projections of a normal of said primitive surface onto axes perpendicular to said X-Y plane, said X-Z plane, and said Y-Z plane to select said major plane.

17. The graphics processing subsystem as recited in claim 15 wherein said respective major-plane viewports include viewports corresponding to each of said X-Y plane, said X-Z plane, and said Y-Z plane for each of said plurality of clipmap levels.

18. The graphics processing subsystem as recited in claim 14 wherein said plurality of PS instances include a PS for each of said pixels for each of said plurality of clipmap levels.

19. The graphics processing subsystem as recited in claim 14 wherein said plurality of PS instances are operable to test if said update applies to each of said plurality of clipmap levels.

* * * * *